Figure 1:
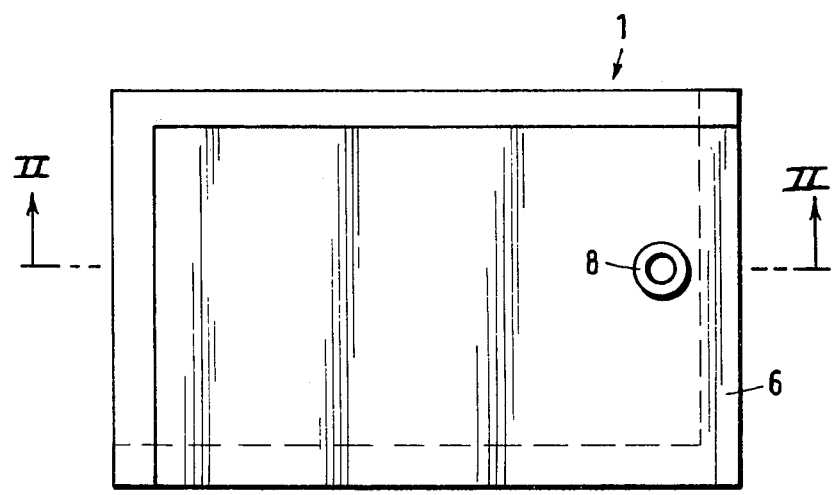

United States Patent [19]

Schilf

[11] 4,417,382
[45] Nov. 29, 1983

[54] METHOD OF THERMALLY INSULATING VESSELS

[76] Inventor: Lothar Schilf, Am Freibad 9, 2807 Achim, Fed. Rep. of Germany

[21] Appl. No.: 354,706

[22] Filed: Mar. 4, 1982

Related U.S. Application Data

[62] Division of Ser. No. 133,408, Mar. 24, 1980, Pat. No. 4,349,051.

[30] Foreign Application Priority Data

Mar. 23, 1979 [DE] Fed. Rep. of Germany ....... 2911416

[51] Int. Cl.³ ....................... B23P 17/00; B21D 22/10
[52] U.S. Cl. ...................................... 29/421 R; 72/60
[58] Field of Search ......... 29/421 R, 455 R, 455 LM; 428/69; 220/422, 468; 72/60

[56] References Cited

U.S. PATENT DOCUMENTS 2,108,212  2/1938  Schellens ........................... 220/468
2,164,143  6/1939  Munters .............................. 220/422
2,699,583  1/1955  Kurtz .................................... 29/455
2,745,173  5/1956  Janos ..................................... 29/455
3,052,019  9/1962  Strasser ................................. 29/455
4,273,161  6/1981  McLaughlin ..................... 29/421 R

FOREIGN PATENT DOCUMENTS 730146   5/1955  United Kingdom .................. 154/45
1061204  3/1967  United Kingdom .................. 428/69

Primary Examiner—Mark Rosenbaum
Assistant Examiner—Steven Nichols
Attorney, Agent, or Firm—Brisebois & Kruger

[57] ABSTRACT

An insulation arrangement in which a sheath (2) having at least one thin deformable wall (3), for example of foil, contains a powder insulating material (10), with a high vacuum within the sheath. The vacuum can be drawn through an opening (8) after a filter (9) is inserted to prevent removing the powder when the vacuum is drawn. The insulation arrangement can take the form of a panel or a pipe, and the thin wall (3) can be mechanically deformed after the vacuum is drawn.

7 Claims, 5 Drawing Figures

METHOD OF THERMALLY INSULATING VESSELS

This is a division, of application Ser. No. 133,408, filed Mar. 24, 1980 U.S. Pat. No. 4,349,051.

BACKGROUND OF THE INVENTION AND PRIOR ART

This invention relates to an arrangement for the thermal insulation of high-pressure vessels, pipes, or similar structures, and includes a vacuum-tight sheath with a thin wall and a vacuum-tight sealable opening for filling with insulating material. The invention furthermore relates to a process for the fabrication of an arrangement of this type.

Insulation systems utilizing a vacuum have been known for a long time from cryogenic technology, for example, in the form of so-called DEWAR flasks. These systems are based upon avoiding heat transfer by thermal convection. Because heat transfer by conduction is practically eliminated at the same time, the heat can only be transferred by radiation. In order to counter this, the surfaces of these systems, insofar as heat transfer by radiation could occur between them, are generally made reflective, or the radiation is reduced by the placement of low-emission foils.

From U.S. Pat. No. 1,071,817 a pressure-resistant vessel is known, which also has a pressure-resistant outer casing. The space between the casing and the vessel is evacuated in order to achieve the desired thermal insulation. In addition, the space between casing and vessel is filled with a finely divided material in powder form with absorption properties in order to absorb gas molecules released from the casing or entering through leaks to preserve the vacuum for as long as possible. Either sublimed $SiO_2$ or carbon in powder form is used as the filling material.

Furthermore, from U.S. Pat. No. 2,000,882 as well as from U.S. Pat. No. 2,863,584 double-walled vessels, whose walls are held apart from one another by spacers, are known. The space between the walls is filled with a porous filling material, e.g., diatomaceous earth. A piping system within the filling space is used in order to evacuate the filling space. The atmospheric pressure acting against the walls is intercepted by the spacers. These spacers and the evacuating pipes represent thermal bridges, which impair the insulating properties and make use at high temperatures impossible.

According to U.S. Pat. No. 2,108,212, the filling of the double-walled vessel with charcoal in powdered form according to U.S. Pat. No. 1,071,817 has not proved satisfactory because this material is particularly hygroscopic, and as a result the otherwise good insulating properties are counteracted, insofar as there is no heating simultaneously with filling in order to drive off the moisture.

Moreover, according to U.S. Pat. No. 2,108,212 the briquetting of the carbon or pressing into plates and the positioning of the material in this form between the two walls of an evacuated sheath or of an evacuable double-walled vessel to provide support from one wall to the other was attempted in order to achieve improved strength. It was found, however, that the mechanical compression of the finely powdered carbon leads to the caking of this material and that as a result the otherwise good insulating properties are lost. This effect also occurs when carbon in powder form is filled between flexible thin walls with no spacers and is expected to serve as the spacing material. The disadvantages of spacers are then indeed avoided, moreover the use of briquetted filling plates of carbon powder—with relatively poor thermal insulation is eliminated. The filling of carbon powder between the flexible walls is, however, also strongly compressed by atmospheric pressure after evacuation with the result that the individual carbon particles cake together and produce an undesirable high solid thermal conductivity.

In order to avoid the disadvantages occurring from the use of carbon powder for self-supporting insulating elements, it was proposed in U.S. Pat. No. 2,108,212 that the carbon powder be pressed into a granulate before filling because then the solid thermal conductivity within the carbon is very small as a result of the minimum contact of the individual granules, and the worrisome caking of the cabon particles is certainly avoided. At the same time a relatively large surface area remains, and thereby good absorption properties of the carbon material are retained. Moreover, the granulate should maintain the space between the sheath walls certainly and reliably. A disadvantage is that in the case of self-supporting plates filled with carbon granulate the additional granulate production which is necessary results in higher costs and particularly the use of plates of this type or insulating elements is not possible under high-pressure conditions because then the individual granules break and cake under the working of the outer pressure.

From U.S. Pat. No. 2,164,143 a process for the fabrication of thermal insulating elements, which are designed to be self-supporting (i.e., without spacers) and which consist of a flexible, thin sheath that is filled with a porous material in powder form, e.g., carbon or diatomaceous earth and then evacuated is known. According to this known process, a sheath of thin, flexible material is filled with the porous material in powder form. Thereby the sheath is enclosed in a supporting form, and the filling material is pressed together so that the filling material exerts a mechanical pressure against the sheath. Finally, the sheat is closed, and gas is evacuated from the sheath, whereby the mechanical pressure of the filling material is exerted against the outer atmospheric pressure and opposes it. This known fabrication process satisfies its purpose, namely, the fabrication of dimensionally exact insulating elements through corresponding pre-compression of the insulating material in filling, only for insulating elements used with an outer atmospheric pressure because only then is the compensation between the pre-compression pressure working from the inside against the sheath and the outside atmospheric pressure guaranteed. Moreover, the elements fabricated by this process have an evacuating pipe system within the filling space, which makes the elements inappropriate for applications in high-temperature regions because of the resulting thermal bridges.

For high-pressure and high-temperature applications an evacuated insulating element, which also possesses a sheath of thin, flexible foil material or sheet as well as an insulating material within the sheath or spacer, was proposed in DE-OS No. 26 15 299. Glass-fiber felt is proposed as the insulating material. As a result of its relatively great hardness, the fibers of the glass-fiber felt generally touch one another by point contact even after the evacuation so that at the crossing points of two fibers, respectively, a high thermal resistance results; and the thermal conductivity through the element possesses the desired low value. The thermal conductivity λ is approximately a factor of 10 smaller for this element than for known hard-foam plates or plates of mineral or glass fibers.

The known evacuated element from DE-OS No. 26 15 299 possesses the disadvantage that only with the utilization of absorption substance within the filling space can the vacuum be maintained under a permissible final pressure of approximately $10^{-1}$ torr because the glass-fiber felt possesses no absorption properties. Even with the use of absorber substances only lifetimes of less than 30 years can be achieved. Moreover, the glass fibers cake at over 400° C. and then have unfavorable high body thermal conductivity. As a result of the very low packing density of the glass fibers, which occupy approximately 10% of the volume, and of the disordered orientation, the glass fiber felt is moreover only reversibly compressible and returns to the unloaded condition after pressure release. Thence, the elements under alternating pressure loading experience unpredictable microscopic deformations which can lead to the damaging of the glass-fiber felt and the sheath.

SUMMARY OF THE INVENTION

As compared with this, the object of the invention is to provide an insulating arrangement which possesses a very low thermal conductivity and a very long lifetime, is simple and inexpensive to fabricate, is relatively dimensionally stable, and withstands high-temperature stresses as well as high-pressure applications.

In accordance with this invention, an arrangement is proposed which contains a vacuum-tight, at least partly thin wall sheath with a vacuum-tight sealable opening for filling with insulating material, in which the sheath is evacuated and sealed vacuum-tight after the filling. This arrangement is characterized accord to the invention by the fact that insulating material consists of a material in powder form with open pores and irregular form of the powder particles, and is compressed with a given high pressure after the sealing of the sheath.

The advantages of the invention lie particularly in that the powder particles of the insulating material support one another with small contact areas as a result of their irregular form so that sufficiently many, and adequately small interstices remain which permit the evacuation of the air from the insulating material without an evacuating-pipe system within the sheath. By this means inhomogeneities within the filling space and associated thermal-conductivity paths are eliminated; the arrangements possess, with the exception of the unavoidable boundary effects, very homogeneous, and uniform insulating properties.

In particular, it has been found that the insulating material used according to the invention permits postcompression of the sheath from outside after evacuation and sealing of the sheath without degrading the insulating properties significantly. Post-compression with pressures of several hundred bars is possible and produces an irreversible deformation of the flexible sheath walls.

An important characteristic of the invention consists of the appropriate choice of the porous insulating material in powder form and of the appropriate irregular form of the powder particles. By this choice slight contact of the powder particles with each other is guaranteed; at the same time the insulating material is compressible from outside at least to the desired operating pressure, while changing the packing density of the powder particles as well as their form only to a minor extent.

The insulating material possesses a very large surface area as a result of the open pores, which adsorb residual gases in the vacuum efficiently over a long time, whereby a desired long lifetime, several hundred years, can be achieved without additions of absorber substances.

The arrangement for thermal insulation according to the invention withstands high pressures up to several hundred bars and high temperatures to approximately 1000° C. with reliability and is appropriate particularly in applications for coal gasification, coal liquefaction, or fluidized-bed fired coal power plants.

The opening of the sheath preferably takes the form of an exhaust connection, through which the insulating material is poured and which after filling serves for the evacuation of the sheath. In order to hinder the sucking out of the insulating material during evacuation, preferably an air-permeable mat, which fills a certain space located before the exhaust connection, is placed on the insulating material so that a desired exhaust area is realized.

The use of powdered natural or synthetic diatomaceous earth which possesses a low thermal conductivity contains pores in capillary form open to the outside, and whose individual particles possess a very irregular structure, e.g, star-shaped, lanceolate, spherical, etc. is particularly preferred. The particle size of this material lies preferably in the range from 1 to approximately 100 microns and the pore size lies in the range of a few microns. This material possesses all properties which are necessary for the fabrication at favorable costs of thermal insulating elements of high quality and very long lifetime and great accuracy. The strength and the form of the powdered diatomaceous earth permits an irreversible compressibility, as the result of which a good accuracy and regular surface of the elements even without the use of stabilizing peripheral supports, etc. as well as use in a high-pressure environment are readily attainable. Because of the capillary pores, the long-term absorption is very great. Moreover, the mean free path of the residual gases in an evacuated insulating system with diatomaceous earth is in the range of approximately 10 torr so that the thermal conductivity begins to increase significantly only above approximately 10 torr. Tests performed over a period of approximately 3 months, which were initiated at a lower pressure value of $2.7 \times 10^{-3}$ mbar, have shown, by extrapolation, that the upper boundary pressure of 10 torr is first reached at a lifetime of 1800 years.

In the arrangement according to the invention, the thermal conductivity λ is of the order of magnitude of a few $10^{-3}$ watt/m-degree-Kelvin at outer pressures of several 10 bars and is only degraded at much higher outer pressures by a maximum of ten.

The diatomaceous earth preferrably contains $SiO_2$ which amounts to more than 80 weight-percent. The portion of $Fe_2O_3$ in the diatomaceous earth preferably lies between 5 and 15 weight-percent; the portion of $Al_2O_3$ preferably amounts to less than 5-weight-percent, and the portion of CaO preferably amounts to less than 2 weight-percent. Moreover, traces of $K_2O$ and MgO are contained in the diatomaceous earth. With diatomaceous earth of this composition, the invention can be accomplished particularly advantageously.

Figure 3:
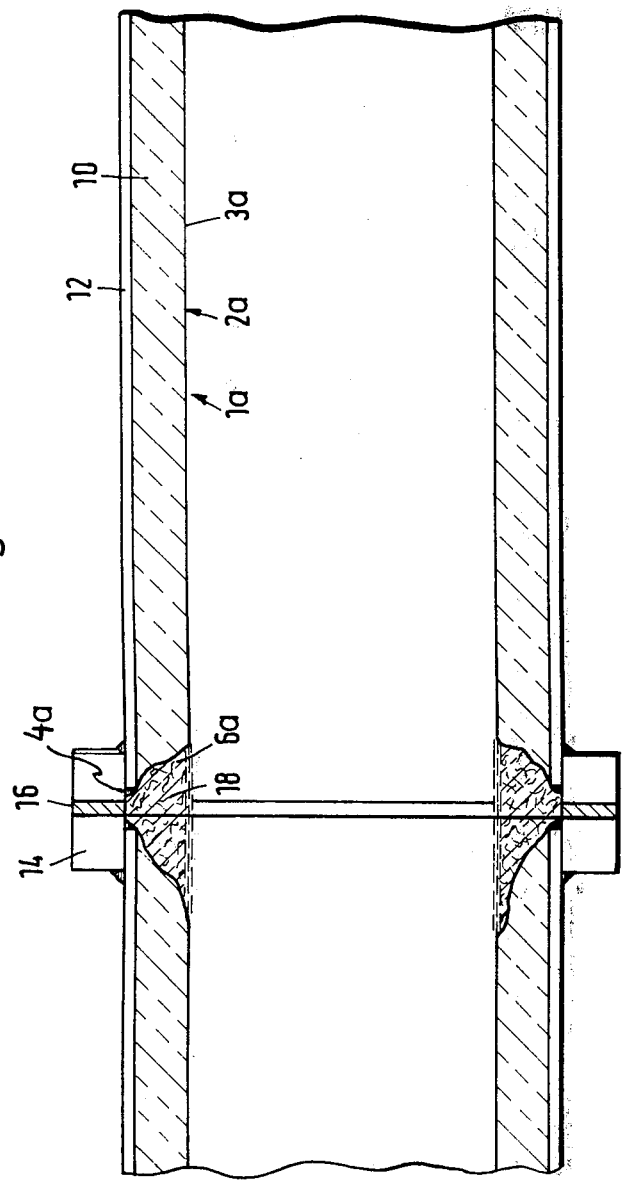
Figure 4:
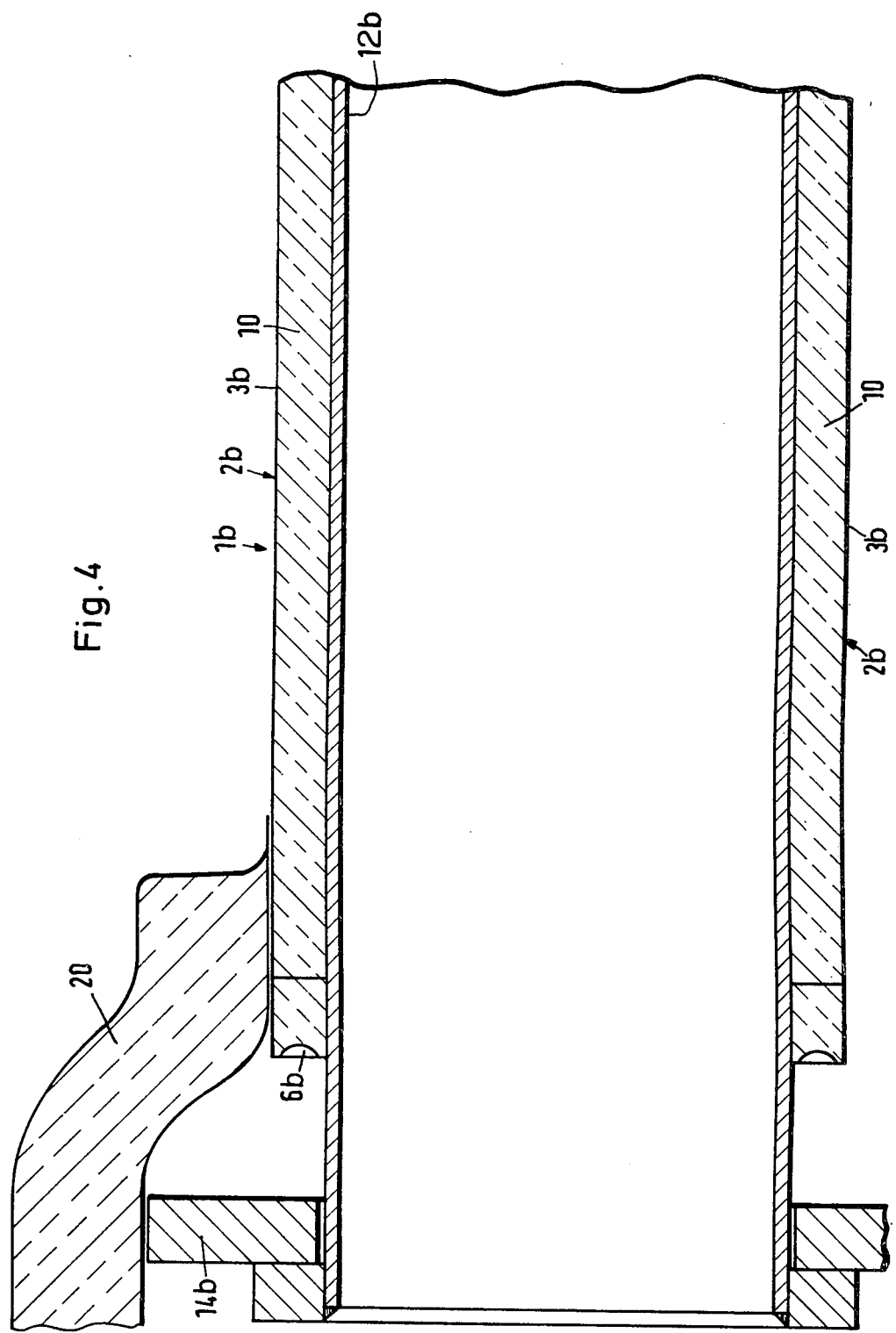

As a result of the pouring properties of the powdered porous insulating materials, particularly of the diatoma- The sheath of FIG. 4 can take the form of a sleeve with foil walls completely enclosing the insulation 10 and which is slid axially around the pipe after the vacuum is drawn and the sheath is sealed. The sleeve can then be radially compressed inwardly against the pipe. Alternatively the sheath of FIG. 4 can have an end of its foil wall 3b welded to the rigid pipe as in the embodiment of FIG. 3 so that the pipe forms a wall of the sheath.

Of course, the arrangement of FIG. 3 can include an insulator in which the insulating material is wholly contained within a sheath having foil walls. In such an arrangement the foil sheath after the vacuum is drawn is placed in the pipe 12 and internal pressure is applied to expand the sheath radially outwardly against the inside of the pipe. Ends of the foil sleeve can be welded either to the pipe or to each other to prevent fluid flowing through the pipe from entering the region between the inside of the pipe and outside of the sheath.

Figure 2:
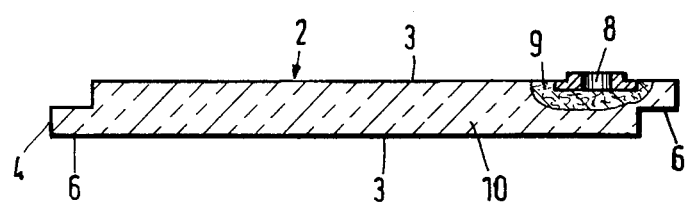
Figure 5:
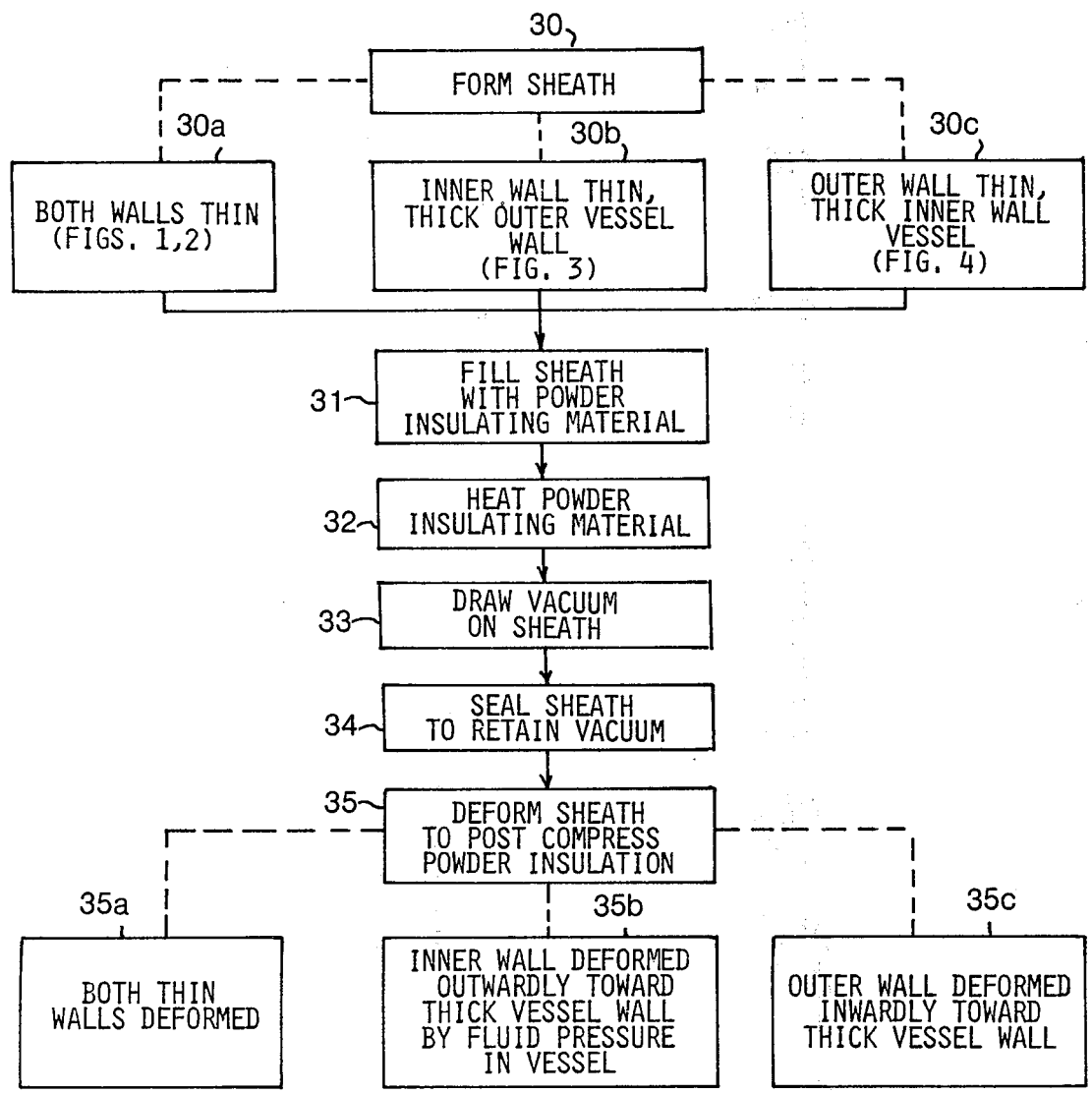

FIG. 5 illustrates the method of the invention in the steps 30–35. The type of sheath formed in step 30 can be that of FIGS. 1, 2 (step 30a), that of FIG. 3 (step 30b), or that of FIG. 4 (step 30c).

The so-formed sheath is then subjected to the treatment of steps 31 through 35 which are the same for the several embodiments of the sheath arrangements of FIGS. 1–4 and have been previously described. It is to be understood that steps 32 and 33 need not be performed in the sequence indicated. The powder insulating material can be heated before, during, or after the vacuum is drawn on the sheath. The steps 35a, 35b, and 35c relate to the variations which result in the respective constructions of FIG. 1, FIG. 3, and FIG. 4.

While several preferred forms of the invention have been shown and described, numerous changes can be made without departing from the scope of this invention.

What is claimed is:

1. A method of thermally insulating the pressure containing side of high pressure vessels and pipes, comprising the steps of
    forming a sheath having spaced walls,
    filling the sheath with a powder insulating material comprising powder particles with open pores and irregular form,
    drawing a vacuum in said sheath through an opening in the sheath,
    heating said insulating material,
    sealing said opening while maintaining the vacuum, and irreversibly deforming the inside wall portion of the sheath after sealing the sheath to postcompress the insulating material, wherein said step of forming the sheath comprises forming the sheath with a thick wall and a thinner deformable wall, and irreversibly deforming the thinner wall toward the thick wall after sealing the sheath, and wherein the thick wall is a vessel with a rigid wall and the thinner wall is within the vessel, and said step of irreversibly deforming comprises deforming the thinner wall radially toward the thicker wall to postcompress the insulating material.

2. A method according to claim 1 further comprising pressing the insulating material into the sheath before drawing the vacuum to precompress the material.

3. Method according to claim 1 wherein said step of deforming comprises deforming the thinner wall radially toward the thicker wall with fluid under pressure.

4. Method according to claim 3 wherein said step of deforming with fluid pressure comprises deforming with the pressure of a fluid flowing through the vessel.

5. Method according to claims 1, 3 or 4 wherein said step of deforming the wall comprises deforming the wall with a fluid under a pressure of several hundred bars.

6. Method according to claim 5 wherein said vessel is a pipe.

7. Method according to claims 1, 3 or 4 wherein said vessel is a pipe.

* * * * *